United States Patent
Bonfrate et al.

(10) Patent No.: US 7,471,793 B2
(45) Date of Patent: Dec. 30, 2008

(54) METHOD AND APPARATUS FOR USE IN ENCRYPTED COMMUNICATION

(75) Inventors: Gabriele Bonfrate, Milan (IT); Paul D. Townsend, County Cork (IE)

(73) Assignee: Corning Incorporated, Corning, NY (US)

(*) Notice: Subject to any disclaimer, the term of this patent is extended or adjusted under 35 U.S.C. 154(b) by 711 days.

(21) Appl. No.: 10/449,995

(22) Filed: May 30, 2003

(65) Prior Publication Data
US 2004/0032954 A1 Feb. 19, 2004

Related U.S. Application Data

(60) Provisional application No. 60/424,991, filed on Nov. 8, 2002.

(30) Foreign Application Priority Data
May 31, 2002 (GB) ................. 0212627.4

(51) Int. Cl.
*H04K 1/00* (2006.01)
(52) U.S. Cl. .................. 380/256; 398/116; 398/141
(58) Field of Classification Search .......... 380/256
See application file for complete search history.

(56) References Cited

U.S. PATENT DOCUMENTS

| | | | |
|---|---|---|---|
| 5,243,649 A | | 9/1993 | Franson |
| 5,307,410 A | * | 4/1994 | Bennett ............ 380/256 |
| 5,515,438 A | * | 5/1996 | Bennett et al. ......... 380/278 |
| 5,675,648 A | | 10/1997 | Townsend |
| 5,768,378 A | | 6/1998 | Townsend et al. |
| 5,953,421 A | | 9/1999 | Townsend |
| 6,424,665 B1 | * | 7/2002 | Kwiat et al. ............. 372/21 |

FOREIGN PATENT DOCUMENTS

GB 2297448 7/1996

(Continued)

OTHER PUBLICATIONS

Marand et al.; "Quantum Key Distribution Over Distances as Long as 30km"; Optics Letters; Aug. 15, 1995; vol. 20, No. 16; pp. 1695-1697.

(Continued)

*Primary Examiner*—Matthew B Smithers
*Assistant Examiner*—Shewaye Gelagay
(74) *Attorney, Agent, or Firm*—Gregory V. Bean (57) ABSTRACT

A method and apparatus for secure distribution of cryptographic key information based on quantum cryptography is described. The apparatus incorporates or is used with a transmitter comprising a source of pairs of dim, depolarized light pulses together with a phase modulator and random number generator that are used to encode the pulse pairs with the binary key information by changing the relative phases of the pulses of some pairs. The apparatus incorporates a receiver comprising a polarization beam splitter, and a pair of interferometers and optical detectors. The invention overcomes problems associated with polarization evolution in quantum cryptography systems that incorporate a non-polarization-preserving optical channel (e.g. standard optical fiber). In addition the invention removes the need for an active random number generator and phase modulator at the receiver, because the polarization beam splitter acts as if it were a random router, thereby achieving significant reduction of the cost and complexity of the apparatus.

17 Claims, 5 Drawing Sheets

FOREIGN PATENT DOCUMENTS

| | | |
|---|---|---|
| GB | 2368502 | 5/2002 |
| WO | WO 97/44936 | * 11/1997 |

OTHER PUBLICATIONS

Bennett et al,; "Quantum Crypotgraphy Using any Two Nonorthogonal States"; Physical Review Letters; May 25, 1992; vol. 68, No. 21; pp. 3121-3124.

Townsend; "Quantum Cryptography on Optical Fiber Networks"; Optical Fiber Technology; 1998; vol. 4; pp. 345-370.

Hashizume et al.; "Integrated Polarisation Beam Splitter Using Waveguide Birefringence Dependence on Waveguide Core Width"; Dec. 6, 2001; vol. 37, No. 25; pp. 1517-1518.

Bonfrate et al; "Asymmetric Mach-Zehnder Germano-silicate Channel Waveguide Interferometers for Quantum Cryptography Systems"; Jun. 21, 2001; vol. 37, No. 13; pp. 846-847.

Zbinden et al; "Interferometry with Faraday Mirrors for Quantum Cryptography"; Mar. 27, 1997; vol. 33, No. 7.

Bennett et al.; "Privacy Amplification by Public Discussion"; SIAM J Comput; vol. 17, No. 2, Apr. 1988; pp. 210-229.

Bennett et al.; "Quantum Public Key Distribution System"; IBM Technical Disclosure Bulletin; vol. 28, No. 7, Dec. 1985; pp. 3153-3163.

Bennett et al.; "Experimental Quantum Cryptography"; Journal of Cryptology; vol. 5, No. 1, 1992; pp. 3-28.

Wegman et al.; "New Hash Functions and Their Use in Authentication and Set Equality"; Journal of Computer and System Sciences; vol. 22, No. 3, 1981; pp. 265-279.

Bennett et al.; "Generalized Privacy Amplification"; IEEE; 1994; p. 350.

Yokoyama et al.; Practically Feasible Dispersion Flattened Fibers Produced by Vad Techniques; ECOC; 1998; vol. 1; pp. 131-132.

* cited by examiner

METHOD AND APPARATUS FOR USE IN ENCRYPTED COMMUNICATION

RELATED APPLICATIONS

This Application claims the benefit of priority under 35 U.S.C. §119 of UK Patent Application No. 0212627.4, filed on May 31, 2002, in the name of Gabriele Bonfrate and Paul D. Townsend, the entire content of which is incorporated herein by reference. This application also claims the benefit of priority under 35 U.S.C. §119(e) of U.S. Provisional Application No. 60/424,991 filed on Nov. 8, 2002, the entire content of which is incorporated herein by reference.

BACKGROUND TO THE INVENTION

1. Field of the Invention

The present invention relates to a method for use in encrypted communication and to apparatus for use in the method; it is primarily concerned with a technique for establishing cryptographic key information. In particular it relates to a technique known as quantum cryptography.

2. Technical Background

In quantum cryptography fundamental physical laws are exploited to guarantee the secrecy of cryptographic keys transmitted over communication channels that may be subject to eavesdropping. Secure digital communication between two parties can in principle be achieved using the techniques of classical 'secret key' cryptography in which a publicly available algorithm that is activated by a secret and preferably random bit sequence (key) is used for encryption and decryption of transmitted information. In such a scheme the security of the system hinges entirely upon the secrecy of the key, and the users of the system must therefore ensure that any process used to establish, transmit, share or distribute the key is not susceptible to eavesdropping.

This problem of establishing a key securely has conventionally been addressed, for example, by the use of trusted couriers or by the use of 'public key' encryption techniques that allow the key to be transmitted in encrypted form over an insecure communication channel. However, the security of these methods cannot be guaranteed in principle: the former relies on the trustworthiness of the courier and the latter upon unproven assumptions concerning the difficulty of factoring large numbers. By contrast, quantum cryptography provides a method of establishing a key whereby the secrecy of the key can in principle be guaranteed since security is based upon fundamental physical laws.

In quantum cryptography the key information is encoded in a characteristic (in practice polarisation or phase) that can be carried by single optical photons that are transmitted over an optical path linking the two users of the system. In practical terms, encoding of single photons is not needed, and the signal transmitted is normally a notional encoded pulse sequence of so low an intensity that the probability of an individual pulse being observed to contain more than one photon is small. Typically the intensity will be such that only about one pulse in ten contains even one photon and the proportion containing two or more photons is less than one in a hundred. Pulses meeting this requirement will be referred to as "dim" pulses. The quantum properties of such signals ensure that any attempt at eavesdropping during transit will yield only partial information on the key and will also generate errors that are detectable by the legitimate users of the apparatus, since any photon detected by an eavesdropper is likely either to fail to reach its intended destination or to have been changed by the detection process. The quantum cryptography protocol exploits these fundamental properties to allow the legitimate users of such a communication channel to establish a shared, authenticated and certifiably secret key. The users can then employ the secret key together with an encryption algorithm such as the one-time-pad, for example, to encrypt and decrypt sensitive information that they wish to exchange in either direction.

The original quantum cryptography protocol formulated by C. H. Bennett and G. Brassard is described in their publication entitled 'Quantum Public Key Distribution System', *IBM Technical Disclosure Bulletin*, 28, 3153 (1985). This paper describes a system in which dim pulses of polarisation-encoded light are used to distribute the key information over an optical channel called the 'quantum channel'. In such a scheme the transmitter A and the receiver B must share and maintain a common polarisation reference frame such that a vertically polarised pulse transmitted by A is received as a vertically polarised pulse by B, for example. This leads to the requirement for a polarisation maintaining quantum channel since any polarisation changes induced by the channel will increase the error rate in the system and so may make the system insecure or wholly ineffective. Standard optical communications fiber is potentially an excellent low loss medium that could be used to provide a quantum channel. However, the optical polarisation is not maintained in this type of fiber and instead tends to evolve and fluctuate with time. This is caused by environmental variations that lead to unpredictable fluctuations in the fiber birefringence. In principle an active polarisation controller can be used to track and compensate these polarisation changes, but this adds significantly to the cost and complexity of the quantum cryptography apparatus.

In a subsequent publication "Quantum Cryptography Using Any Two Non-Orthogonal States", *Physical Review Letters*, 68, 3121 (1992), C. H. Bennett described an interferometric version of quantum cryptography in which dim pulses of light are phase encoded within a Mach-Zehnder interferometer that forms the basic quantum channel. In principle such an interferometric scheme can be immune to polarisation variation in the transmission fiber. This is because interference 'visibility' does not depend on the specific polarisation states of the interfering optical field components, only upon relative differences in these polarisation states. In practice, however, real implementations of this scheme are not immune to polarisation variations in the transmission fiber, because the optical components such as fiber couplers and phase modulators that are used to fabricate the transmitter and receiver parts of such a system typically exhibit birefringence and other polarisation dependencies. In general the degrees of birefringence in the spatially separated paths within the interferometer will not be identical and this leads to variations in the relative polarisation states of the interfering optical fields when the polarisation in the transmission fiber evolves.

C. Marand and P. D Townsend demonstrated a practical version of this interferometric approach using four non-orthogonal phase states in the paper "Quantum Key Distribution Over Distances as Long as 30 km", *Optics Letters*, 20, 1695 (1995). Their experimental quantum cryptography system required active polarisation control to avoid the deficiencies described above.

Subsequently H. Zbinden, et al proposed an alternative solution to this problem in the publication "Interferometry with Faraday Mirrors for Quantum Cryptography," *Electronics Letters*, 33, 586 (1997). In this approach the dim, phase encoded optical pulses are also polarised and also undergo a time dependent polarisation evolution in the fiber. However, by transmitting the optical pulses in both directions over the fiber and using a Faraday mirror to perform the reflection function, the polarisation evolution can be automatically compensated via the non-reciprocal properties of the Faraday Effect. This advantage is only obtained, however, at the penalty of the additional cost and complexity associated with the use of the Faraday mirror based design.

Recently G. Bonfrate et al demonstrated a compact, potentially low cost interferometer for quantum cryptography based on waveguide integrated optics in a publication entitled "Asymmetric Mach-Zehnder Germano-Silicate Waveguide Interferometer for Quantum Cryptography Systems", *Electronics Letters*, 37, 846 (2001). The Faraday mirror based design is not amenable to monolithic integration using such waveguides since germano-silicate does not exhibit the Faraday effect.

One of the present inventors has proposed in WO97/44936 a technique for establishing a key in a method of using a non-polarisation-preserving optical link in which a first party to the communication (referred to as the transmitter, as it is the party that transmits by the quantum channel, though it may be either the transmitter or the receiver, or both by turns, of the eventual encrypted signal) sends to a second party (the receiver) a signal comprising pairs of effectively unpolarised dim pulses obtained by delaying a fraction of the signal by a constant predetermined time interval; at the receiver, a component of the signal that is polarised in a predetermined direction is selected by a polariser, and the relative phases of pulse pairs in that component are determined by delaying a substantially equal fraction of the signal by substantially the same predetermined interval, so that the pulses that were delayed in the transmitter but not in the receiver are brought into coincidence with those which were delayed in the receiver but not in the transmitter, whereby interference occurs, and phase differences between pairs of pulses are distinguished by observations responsive to the nature of such interference. It will be noted that the apparatus described requires a receiver that is active in the sense that it contains an active phase modulator driven by a random number generator, a polariser (which necessarily has an insertion loss of at least −3dB) and several polarisation controllers at different points.

SUMMARY OF THE INVENTION

The present invention provides an alternative to this technique in which the need for an active receiver, a polariser and polarisation controllers is avoided, with a beneficial effect on complexity and cost.

According to one aspect of the present invention, a method of establishing a key between a transmitter and receiver by quantum cryptography using a non-polarisation-preserving optical link in which the transmitter sends to the receiver a signal comprising pairs of effectively unpolarised dim pulses obtained by delaying a fraction of the signal by a constant predetermined time interval; and in which at the receiver a component of the signal that is polarised in a predetermined direction is selected, and the phase differences between pairs of pulses in that component are determined by delaying a substantially equal fraction of the signal by substantially the same predetermined interval, so that the pulses that were delayed in the transmitter but not in the receiver are brought into coincidence with those which were delayed in the receiver but not in the transmitter, whereby interference occurs, and phase differences between pairs of pulses are distinguished by observations responsive to the nature of such interference and is characterised by selecting at the receiver two orthogonally polarised components and separately detecting the relative phase of pulses in each of those components.

A significant advantage of the invention is that the interferometers in the receiver are passive in the sense they do not need to contain active phase modulators driven by random number generators; quantum cryptography receivers are typically required to randomly and dynamically switch between two measurement phase shifts, for example 0° and 180°, that are characteristic of two non-orthogonal phase coding representations used in the system. In contrast, in operation of the present invention, one interferometer can be set to continuously detect one coding representation (e.g. phase shift of 0°) and the other interferometer to continuously detect the other coding representation (e.g. phase shift of 180°). In this way an active receiver design is replaced by a totally passive receiver design thereby reducing complexity and cost.

Hitherto such passive detection schemes used in quantum cryptography were based upon the 'random routing' of quantum signals incident on a 50:50 beam-splitter. The present inventors have realised however that dim depolarised optical pulses incident on a polarisation splitter will also exhibit a similar 'random routing' effect.

Pulses are to be considered effectively unpolarised if they have substantially equal components of mutually perpendicular, mutually incoherent linear polarisation, so that the two orthogonally polarised components will be substantially equally populated; they could be obtained from an inherently unpolarised source, but preferably they are derived from a linearly polarised source, for example a pulsed laser, by a "depolariser" that splits light into two substantially equal components, rotates the plane of polarisation of one of the components by 90° and then recombines them. A preferred form of depolariser will be described below.

Our preference is that the fraction of the signal that is delayed as described is one half; but others may prefer a much smaller fraction, for example one tenth, as further discussed below.

The invention includes apparatus for use in quantum cryptography comprising at least a receiver that comprises an interferometer-detector for determining phase differences between pairs of pulses in a sequence that was formed in a transmitter by delaying a fraction of the signal by a predetermined interval, the interferometer-detector delaying a substantially equal fraction of the signal by substantially the same predetermined interval, so that the pulses that were delayed in the transmitter but not in the receiver are brought into coincidence with those which were delayed in the receiver but not in the transmitter, whereby interference occurs, and phase differences between pairs of pulses are distinguished by observations responsive to the nature of such interference characterised in that it includes two such interferometer-detectors and a polarisation beam-splitter for giving dim pulses access to both of the interferometer-detectors.

It should be noted at this point that, since the probability that the dim pulses will be observed to contain more than one photon is small (typically less than 1%), simultaneous detection events will rarely be observed in the two interferometer-detectors. Instead, since the probability of the dim pulses being observed to contain a single photon is much higher (typically 10%), the majority of detection events will be single events occurring with equal probability at either of the interferometer-detectors, but not both. Hence the polarisation beam-splitter acts in effect as a random router for the dim pulses. Most pulses do not lead to any detection event.

Preferably the apparatus includes a transmitter (known per se) comprising a source of randomly phase-encoded pairs of effectively unpolarised dim optical pulses and a non-phase-maintaining optical fiber for transmitting such pulses to the receiver.

It will be understood that once the pulse sequence has been transmitted and the phase differences of some of the pulse pairs contained in it determined as described, a key must be established from it by dialogue between the transmitter and the receiver (which need not be secure, since the result of the phase measurements which determine the digital values attributed to individual pulse pairs does not need to be discussed). It follows that the apparatus also needs to include, or to be used in conjunction with, recording means at the transmitter for maintaining a record of the transmitted pulse sequence, recording means at the receiver for maintaining a record of the results of phase measurements made by the interferometer-detectors and a further (insecure) communication channel between the receiver and the transmitter.

BRIEF DESCRIPTION OF THE DRAWINGS

The invention will now be described in further detail by way of example only with reference to the accompanying drawings, in which.

DESCRIPTION OF THE PREFERRED EMBODIMENT

Figure 1:
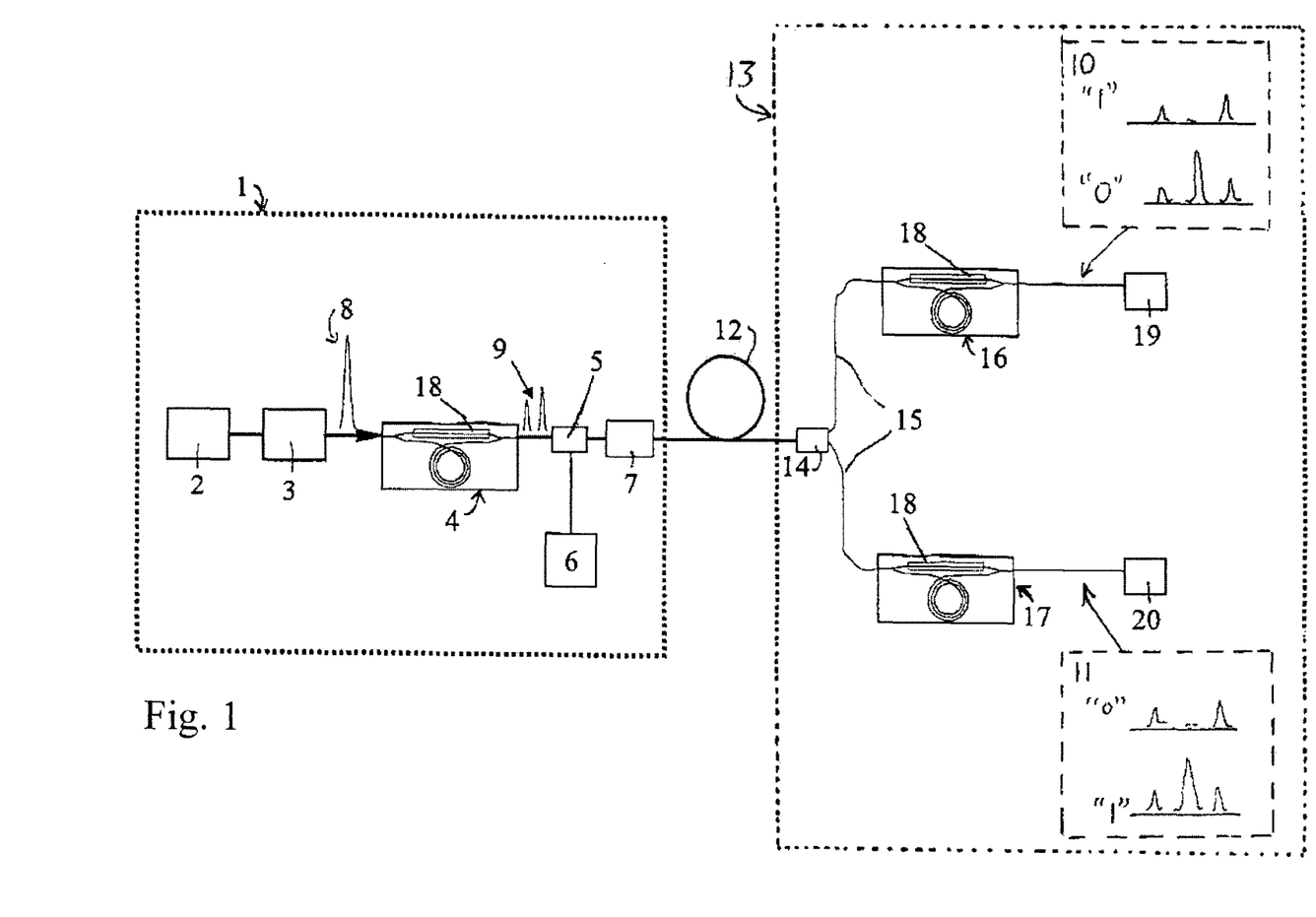
FIG. 1 represents a specific embodiment of the current invention based on a waveguide-integrated Mach-Zehnder interferometer.

FIG. 1 depicts the characteristic optical part of an apparatus for establishing a quantum key in accordance with the current invention. The transmitter 1 includes a pulsed semiconductor diode laser 2, an attenuator 3, a waveguide delay stage 4, a phase modulator 5, a random number generator 6 and a depolariser 7. The delay stage shown is based on the waveguide integrated Mach-Zehnder (MZ) interferometers described by Bonfrate et al in the paper referenced above, from which further details may be obtained. The relative (probabilistic) amplitudes and temporal positions of the components of the dim pulses generated by the transmitter are shown at various points in the system 8-11. The random bits that ultimately generate the cryptographic key are encoded in the phase difference of the dim pulse pairs 9 according to the Bennett 1992 protocol referred to above. That is to say the random number generator 6 switches the phase modulator 5 between two phase settings, namely 0° (bit 0) and 180° (bit 1).

After depolarisation (further discussed below) the dim phase encoded pulses leave the transmitter and propagate through a non-phase-maintaining ordinary transmission fiber 12 before entering a receiver 13. The receiver includes a polarisation beam splitter (PBS) 14 that effectively acts as a random router for the depolarised pulses and gives equal probabilities of observing the pulses in the upper or lower output branches. The PBS outputs are linearly polarised and these polarisation states are preserved by using polarisation maintaining fiber 15 for the input pigtails to two further waveguide integrated delay stages 16 & 17 which are identical with each other and with the delay stage 4 in the transmitter. The relative optical path length difference in 16 is set via the heater 18 to give a static phase shift of 0° whereas that in 17 is set to give a static phase shift of 180°.

The relative amplitudes and temporal positions of the resultant pulse envelopes is shown by 10 and 11 where the central peaks represent the pulse component that undergo interference. Note that interference occurs because the delay stages in the transmitter and receiver are identical and hence they combine to form a complete MZ device comprising two matched length paths. The received bit value is then determined as 0 when single-photon detector 19 registers a pulse and as 1 when single-photon detector 20 registers a pulse; thus the detectors 19 and 20 together with respective delay stages 16 and 17 constitute the interferometer-detectors of the receiver. In this way the passive receiver mimics the operation of an active receiver that randomly switches between phase shift settings of 0° and 180°. In addition the use of depolarised pulses together with the polarisation diversity receiver means that the system is insensitive to any fluctuations in the birefringence of the transmission fiber.

Figure 2:
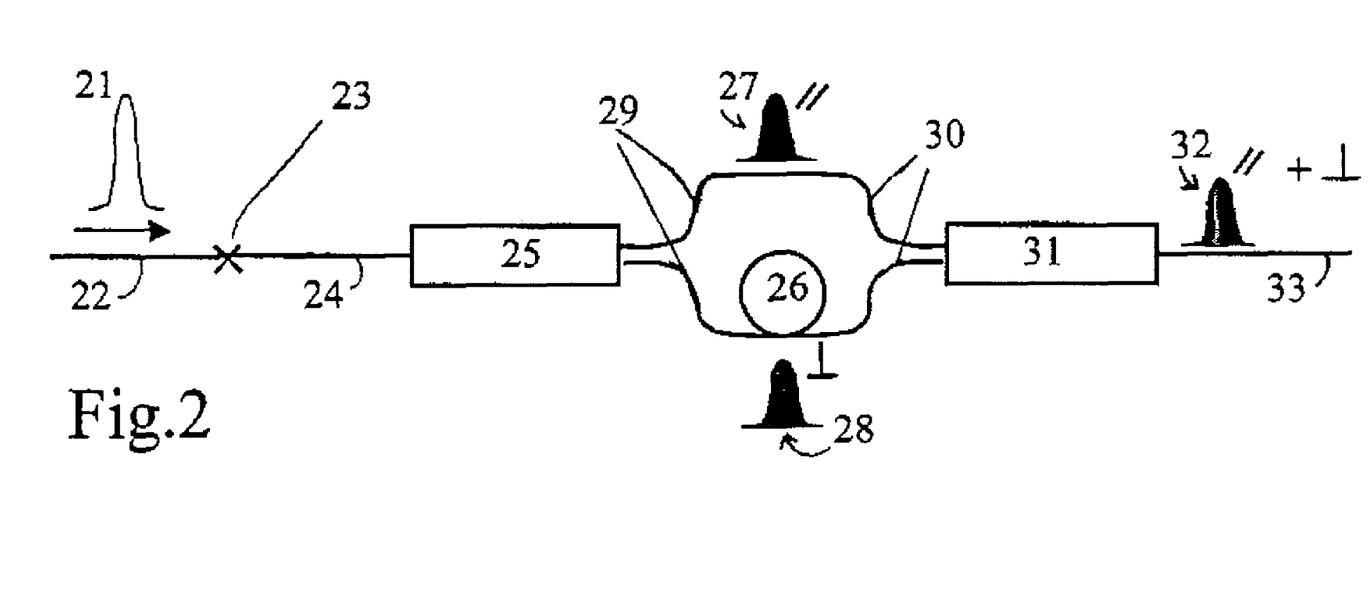
FIG. 2 is a schematic diagram of a depolariser.

The scheme used for the depolariser is shown in FIG. 2. The linearly polarised pulse from the phase modulator 21 is injected into polarization beam splitter 25 after a 45 degree splice 23 between the modulator output pigtail 22 and the polarization beam splitter 25 input pigtail 24, both made of polarisation maintaining fiber. The orientation of the splice excites the same amount of power in the two principal modes of the polarization maintaining fiber of the input pigtail 24. The delay d 26 has to be chosen longer than the pulse coherence time and shorter than the pulse duration itself to ensure that the delayed and non-delayed pulses can be recombined into a single pulse without creating an interference pattern: this is possible provided the laser 2 (FIG. 1) is a gain-switched semiconductor DFB laser because there is a high degree of chirp in the pulses from a laser (time-bandwidth product typically ten times the transform limit). A typical value of d would be about 50 ps. The two orthogonally polarised and (now) incoherent beams 27 and 28 are combined together in a following polarization beam splitter 31, by splicing the polarisation preserving output pigtails 29 of polarization beam splitter 25 to the polarisation maintaining input pigtails 30 of polarization beam splitter 31. This gives effectively a de-polarised pulse 32 slightly longer than the original input pulse at the polarisation preserving output pigtail 31 of polarization beam splitter 31.

Alternatively if an intrinsically depolarised source of light such as amplified spontaneous emission from an optical amplifier were employed in the system the depolariser could be eliminated.

The operation of the apparatus shown in the drawings is as follows:

Laser 2 generates a regular sequence of linearly polarised optical pulses, and attenuator 3 is set to attenuate all of them (except possibly a small number of pulses to act as time markers) to so low a level that the probability of a pulse containing even one quantum is about 0.1. Integrated delay stage 4 splits each of these pulses into two time-spaced pulses as seen at 9 (not quite equal because of different losses in the two branches).

Random number generator 6 provides an input data stream to phase modulator 5 which is the basis for the eventual key: a sequence substantially more than twenty times as long as the key is required at this point; the length of the eventual key depends on the level of security against code-breaking that is desired: for maximum security, the key should be as long as the data stream to be encrypted. Phase modulator 5 is switched or not, according to the digital value of the incoming data stream, between the arrival of the pulses of a pair, to create a phase difference for one of the values. The dim pulse-pair sequence is depolarised as already described and sent via the nonpolarisation-preserving communication fiber 12 to the receiver. Depending on the length and quality of the fiber and associated equipment, some reduction in amplitude and probability of detection will arise in consequence of the normal loss mechanisms of the line.

Thus far, the operation is substantially the same as in WO97/44936, but on arrival at the receiver 13, in accordance with the invention, the pulses are incident on polarisation beam-splitter 14 connected through respective polarisation-preserving fiber pigtails 15 to both the upper delay stage 16 and the lower one 17, and the result is as if pulses were randomly routed to one of the delay stages.

It will be realised that the delays in interferometers 4 and 16 or 17 result in the presence of three pulses in each bit period by the time the detector 19 or 20 is reached (as sketched at 10 and 11 in FIG. 1): each central interference pulse is preceded by a leading satellite pulse that was not delayed in either interferometer and followed by a lagging one that was delayed in both. These satellite pulses carry no information, and detection events occurring in the time-slots corresponding to them are either prevented by gating the detectors to be unresponsive in those time slots, or disregarded if they do occur.

Many bit periods (at the amplitude recommended, at least 90% even in the case of an ideal loss-less installation with perfect detectors) will not result in either detector firing at all, because of the inherently low probability of detecting a pulse with an amplitude corresponding to a small fraction of one photon.

When the single-photon detector 19 fires in the time-slot corresponding to the central interference peak shown in 10, a "0" digit is recorded as received in the corresponding time-slot: when detector 20 fires in the time-slot corresponding to the central interference peak shown in 11, a "1" digit is recorded. If the interference visibility in the installation is good (close to unity), then with high probability these events only occur when a pulse pair is notionally routed to the interferometer that is set to detect it. In these cases, the phase shifts in the two interferometers in the transmitter and receiver are equal, resulting in a net phase shift of zero and an interference maximum. Similarly, it is equally likely that a pulse pair is notionally routed to the interferometer-detector that was not set to detect it; in these cases the net phase shift is 180° corresponding to an interference minimum and hence with high probability no detection event occurs. All such "absences" are disregarded, as are rare but not totally absent timeslots in which both detectors fire, either because corresponding pulses have been of sufficient amplitude for there to be a detectable output at both output ports of the polarisation beam splitter or because of random noise or other stochastic events.

The pulse sequence as detected is recorded, and the receiver notifies the transmitter (by any suitable communication line, which need not be secure) the numbers of the bit periods in which a detection was made (but not the digit value that was detected). The receiver extracts the corresponding digits from its own record of the transmitted digit sequence, and in the absence of errors, this should be identical with the digit sequence recorded by the receiver. In practice, it is likely that some errors will have occurred even if no eavesdropper was present on the channel. These errors can arise from imperfect interference (visibility less than one) or from detector dark counts, for example. It is impossible in principle to distinguish these errors from those caused by eavesdropping, hence all errors are conservatively treated as if generated by an eavesdropper.

If the error rate is sufficiently low (typically of the order of a few percent in practice), then known error-correction and 'privacy amplification' techniques can be employed to distil from the initial bit sequence a smaller amount of highly secret key about which an eavesdropper is very unlikely to know even a single bit. The transmitter and receiver perform error-correction by publicly comparing the parities of blocks of their data, and where these do not match, performing a bisective search within the block to identify and discard (rather than correct) the error [see e.g. C. H. Bennett, F. Bessette, G. Brassard, L. Salvail and J. Smolin, "Experimental Quantum Cryptography", *Journal of Cryptology*, 5, 3-28 (1992)]. In this way they can derive a shared, error free, random bit sequence from their raw data together with a measurement of the error rate and hence an estimate of the amount of information that may have been obtained by an eavesdropper. If, for example, the transmitter and receiver calculate that an eavesdropper may know the values of e bits of an error-corrected string that is n bits long, they can generate from this data a highly secret key with a length of m bits, where m is approximately equal to n-e, simply by computing (but not announcing as in error-correction) the parities of m publicly agreed-on random subsets of their data. This process is known as privacy amplification [for further details, see e.g. C. H. Bennett, G. Brassard, C. Crepeau and U. Maurer, "Generalized Privacy Amplification", *SIAM Journal on Computing*, 17, 210-229 (1998)]. The final stage of the process is for the transmitter and receiver to authenticate their public channel discussions using an information-theoretically secure authentication scheme [see e.g. M. N. Wegman and J. L. Carter, "New Hash Functions and their use in Authentication and Set Equality", *J. Computer and System Sciences*, 22, 265-279 (1981)]. This is to protect against the powerful attack in which an eavesdropper breaks in to the public channel and impersonates the transmitter to the receiver and vice-versa. After privacy amplification and authentication the transmitter and receiver are in possession of a shared, secret bit sequence. All or any selected segment of this bit sequence can be used as a secret key for any standard (or non-standard) encryption technique, or can be expanded using one of the algorithms readily available for the purpose to generate a longer key.

In the apparatus shown in FIG. 1, the modulator 5 is a distinct component. A more difficult but potentially beneficial option is to integrate it into one of the limbs of the interferometer 4.

It will be noted that the technique described does not provide for or rely on bright pulses as required for strict conformity with the Bennett 1992 protocol: if desired, it can be modified to do so, simply by modifying the splitters and recombining couplers in each of the interferometers so that a large proportion (say 90%) of the incident light is routed to the short branch, so that the leading satellite pulses are greatly enlarged (and the trailing ones reduced).

The method and apparatus can also be modified, if desired, to operate in accordance with the Bennett-Brassard 1984 protocol, a previous experimental interferometric implementation of which was described in the paper by Marand and Townsend identified above. This protocol differs from the Bennett 1992 scheme in that there are now two different coding representations, A and B, for one and zero, where A is defined as: 0°="0", 180°="1" and B is defined as: 90°="0", 270°="1". In addition two different measurement phase shifts are used in the receiver, A: 0° and B: 90°. In the receiver illustrated by FIG. 3 the upper interferometer 35 is set to measure representation A and the lower interferometer 36 is set to measure representation B. Each interferometer is connected by dual-output couplers (for instance single-mode directional couplers or multimode interference couplers to two detectors, respectively 37, 38 and 39, 40. The relative probabilities of the various measurement outcomes are indicated as before by the satellite and interference peak amplitudes, which are shown at 41, 42, 43, and 44. As before, only detection events in the central interference peaks carry information. In the cases where an A-representation pulse pair is notionally routed to interferometer 35, a coding value of "1" will lead to detector 37 firing (amplitudes as shown at 41) and a coding value of "0" will lead to detector 38 firing (42).

Figure 3:
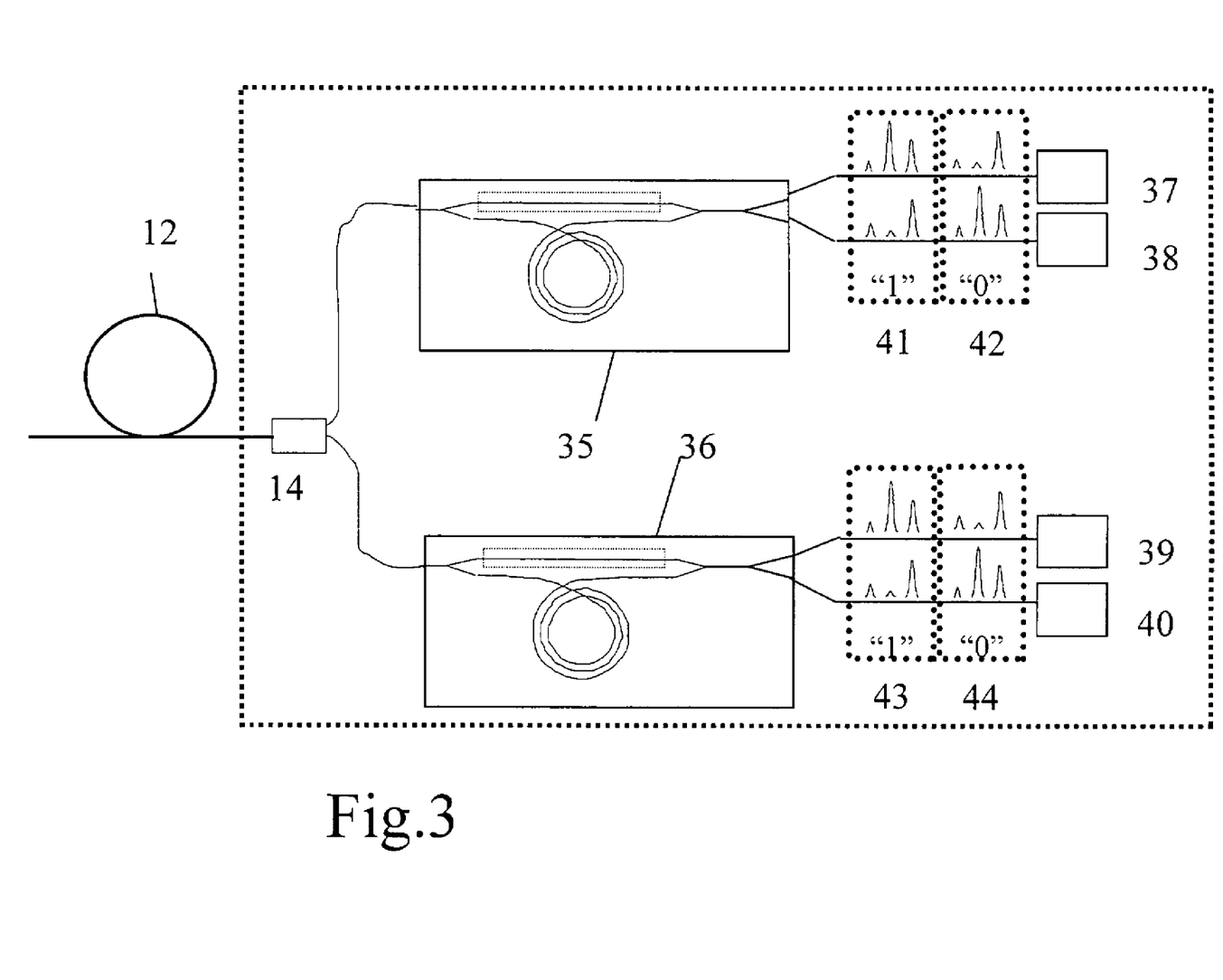
FIG. 3 is a diagram of another embodiment of the invention.

Similarly in the cases where a B-representation pulse pair is notionally routed to interferometer 36, a coding value of "1" will lead to detector 39 firing (43) and a coding value of "0" will lead to detector 40 firing (44). In these instances the net phase shift in the interferometers is either 0° or 180° and hence the outcomes are, except with small probability due to imperfect interference visibility and detector noise, deterministic and the transmitted information is accurately received.

In contrast, in the instances (about half on average) where an A-representation pulse pair is notionally routed to the interferometer set to detect B-representation or vice-versa, the net phase shift in the interferometer is either 90° or 270° and so the outcome is probabilistic with the receiver equally likely to indicate a "1" or a "0". These events are discarded during the post-transmission public discussion phase of the protocol and hence do not lead to errors in the final key. As before any coincidence events between any two or more of the four detectors are also discarded. The use of two incompatible coding representations according to this protocol is intended to ensure that an eavesdropper who might intercept and re-send the bit sequence will generate errors in instances where the transmitter and receiver have used compatible representations, and so alert legitimate users to the possibility that an eavesdropper is present.

If desired, the phase modulator 5 may be integrated into the interferometer 4 by making at least part of the latter of a material which is intrinsically electro-optically active, or can be made so, e.g. by "poling" a glass or a polymer, and replacing the heaters 18 with electrodes. Similarly, the electro-optic effect in an electro-optically active material could be used to adjust the phase-shifts in the receiver interferometers 16 and 17 (or 35 and 36, as the case may be).

Figure 4:
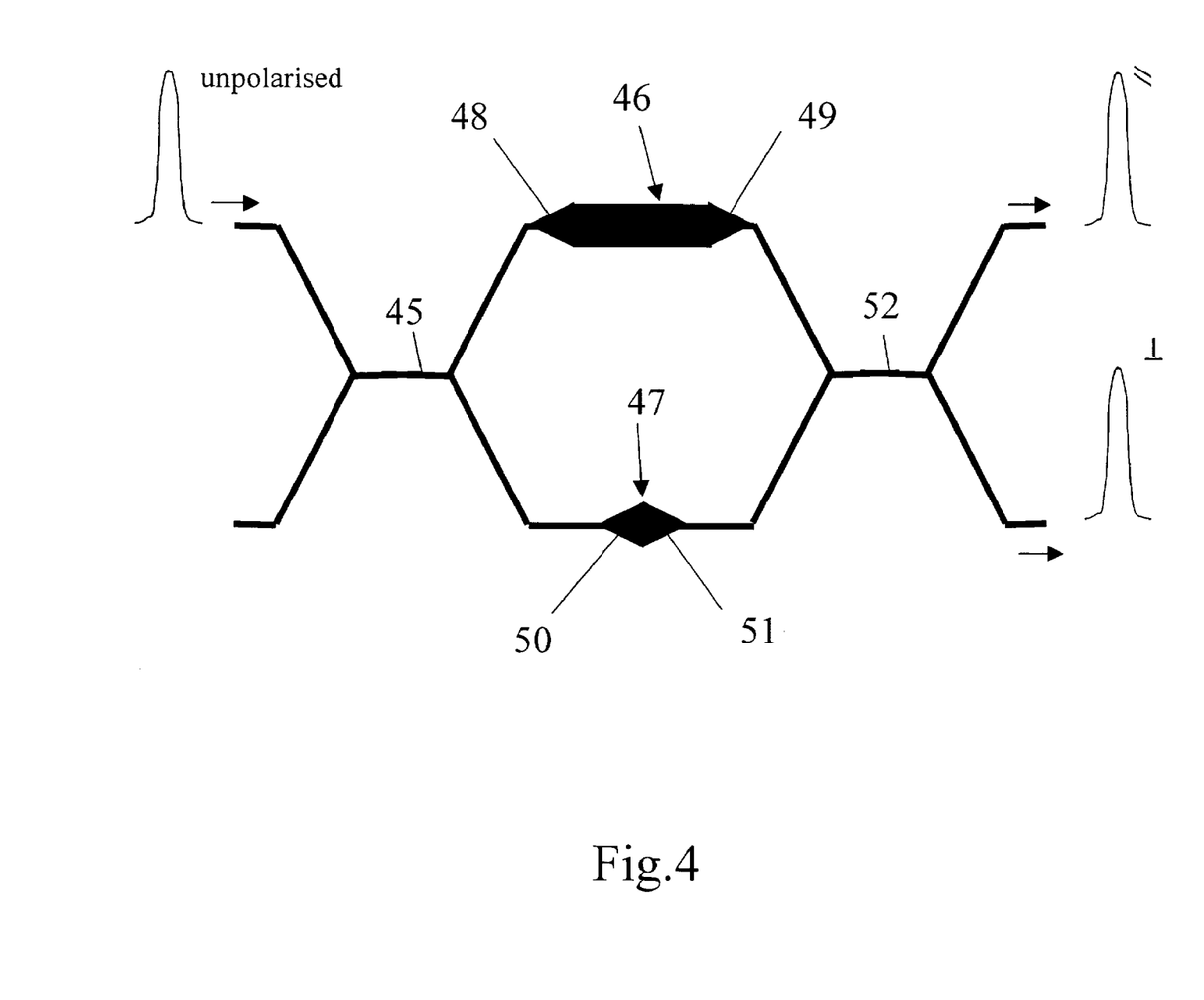
FIGS. 4 and 5 are diagrams illustrating modifications.

The foregoing description has assumed that the polarisation beam splitter is a separate, conventional micro-optic component with fiber connections. While this is effective and reliable, there may be advantages in using a polarisation beam splitter of a type that can be implemented in a planar waveguide, so permitting the polarisation beam splitter and both the receiver interferometers to be integrated on a single chip. A suitable form is proposed in a paper by Hashizume et al in *Electronics Letters*, Vol. 37, No. 25 (6 Dec. 2001) pages 1517-8, to which reference should be made for a fuller explanation of its mode of action. This consists essentially of a planar Mach-Zehnder interferometer structure in which the two limbs differ in the width of their waveguides, and thus differ in birefringence. As seen in FIG. 4, the incoming datastream from the transmitter is divided by a 50:50 splitter 45 between the limbs 46, 47 of a silica-glass based planar waveguide interferometer. Limb 46 is much wider than limb 47 for most of its length and thus has a significantly greater birefringence; to minimise the influence of taper sections 48, 49, like taper sections 50, 51 are inserted in the narrow limb 47. The two limbs come together in a 4-port 50:50 coupler-splitter 52 and its two output ports are connected to interferometer-detectors (not shown here but corresponding to 16/19 and 17/20 in the apparatus of FIG. 1, and function in substantially the same way.

Figure 5:
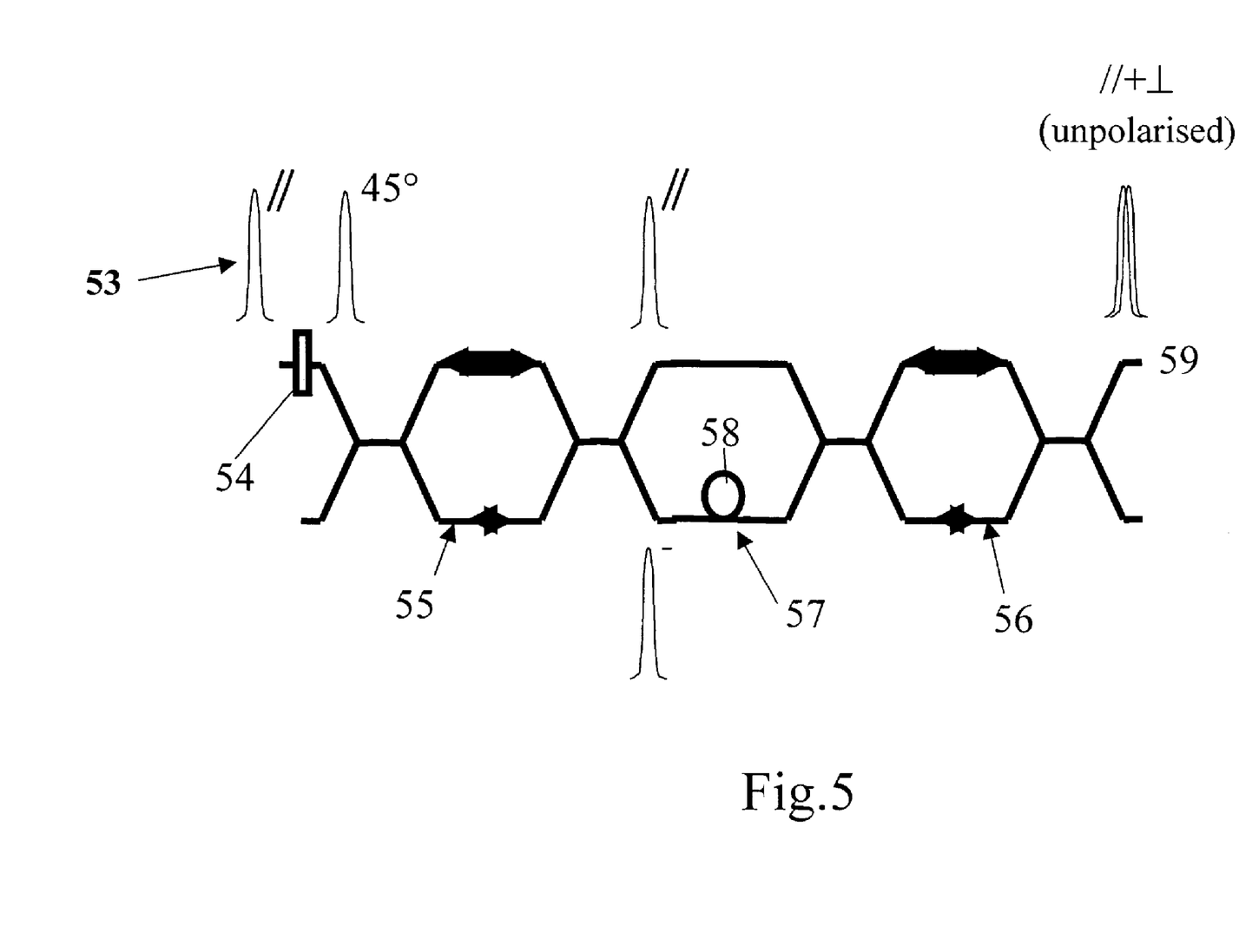

It is also possible to modify the transmitter by implementing the depolariser in a planar waveguide, so permitting the depolariser and the other components of the transmitter to be integrated on a single chip (in the case where the phase modulation function is also integrated into the chip as described above). FIG. 5 shows one form of additional depolariser section that could be added at the output of the transmitter section. The polarisation of the pulses from the transmitter output (53) are rotated 45° by a half-wave plate 54 that is inserted into a slot formed perpendicular to the waveguide. Two polarisation splitter/combiners 55, 56 as described by Hashizume et al. are separated by a delay section 57 incorporating a delay loop 58. The output port 59 is connected to the transmission fiber.

Any discussion of the background to the invention herein is included to explain the context of the invention. Where any document or information is referred to as "known", it is admitted only that it was known to at least one member of the public somewhere prior to the date of this application. Unless the content of the reference otherwise clearly indicates, no admission is made that such knowledge was available to the public or to experts in the art to which the invention relates in any particular country (whether a member-state of the PCT or not), nor that it was known or disclosed before the invention was made or prior to any claimed date. Further, no admission is made that any document or information forms part of the common general knowledge of the art either on a world-wide basis or in any country and it is not believed that any of it does so with the exception of the Bennett/Brassard quantum cryptography protocol.

What is claimed is:

1. A method of establishing a key between a transmitter and a receiver by quantum cryptography using a non-polarisation-preserving optical link comprising:
    sending from a transmitter to a receiver a signal comprising pairs of effectively unpolarised dim pulses obtained by delaying a fraction of the signal by a constant predetermined time interval;
    selecting at the receiver two orthogonally polarised components of the signal, each of which is polarised in a predetermined direction;
    separately determining the relative phases of the pulse pairs in each of said components by delaying a substantially equal fraction of the signal by substantially the same predetermined interval, so that the pulses that were delayed in the transmitter but not in the receiver are brought into coincidence with those which were delayed in the receiver but not in the transmitter, whereby interference occurs; and
    distinguishing phase differences between said pairs of pulses by observations responsive to the nature of such interference.

2. A method as claimed in claim 1 comprising setting a first interferometer in the receiver to continuously detect a first phase coding representation and a second interferometer to continuously detect a second phase coding representation.

3. A method as claimed in claim 1 comprising obtaining said pulses from an inherently unpolarised source.

4. A method as claimed in claim 2 comprising obtaining said pulses from a linearly polarised source by splitting light into two substantially equal components, rotating the plane of polarisation of one of the components by 90° and then recombining said components.

5. A method as claimed in claim 1 in which said fraction is sufficiently small so as to generate bright leading satellite pulses.

6. A method as claimed in claim 5 in which said fraction is substantially one tenth.

7. A method as claimed in claim 1 comprising using in the transmitter an integrated phase modulator and interferometer.

8. A method as claimed in claim 7 comprising using in the transmitter a depolariser implemented in a planar waveguide and integrated on a single chip with the phase modulator and the interferometer.

9. Apparatus for use in quantum cryptography comprising:
   at least a receiver that comprises two interferometer-detectors for determining phases of pulses in a duplicate sequence that was formed by delaying in the transmitter a fraction of the signal by a predetermined interval, each of said interferometer-detectors delaying a substantially equal fraction of the signal by substantially the same predetermined interval so that the pulses that were delayed in the transmitter but not in the receiver are brought into coincidence with those which were delayed in the receiver but not in the transmitter, whereby interference occurs, and phase differences between pairs of pulses are distinguished by observations responsive to the nature of such interference; and
   a polarisation beam-splitter for giving dim pulses access to both of the interferometer-detectors.

10. Apparatus as claimed in claim 9 in which one of the interferometer detectors in the receiver is set to continuously detect one phase coding representation and the other of said interferometer-detectors is set to continuously detect another phase coding representation.

11. Apparatus as claimed in claim 9 comprising a linearly polarised pulse source and a depolariser that splits light into two substantially equal components, rotates the plane of polarisation of one of the components by 90° and then recombines the two components.

12. Apparatus as claimed in claim 9 in which said fraction is sufficiently small so as to generate bright leading satellite pulses.

13. Apparatus as claimed in claim 12 in which said fraction is substantially one tenth.

14. Apparatus as claimed in claim 9 in which said transmitter comprising a source of randomly phase-encoded pairs of effectively unpolarised dim optical pulses and a non-phase-maintaining optical fiber for transmitting such pulses to the receiver.

15. Apparatus as claimed in claim 14 in which the transmitter includes an integrated phase modulator and interferometer.

16. Apparatus as claimed in claim 15 in which the transmitter includes a depolariser implemented in a planar waveguide and integrated on a single chip with the phase modulator and interferometer.

17. Apparatus as claimed in claim 9 further comprising a recorder at the transmitter for maintaining a record of the transmitted pulse sequence, a recorder at the receiver for maintaining a record of the results of phase measurements made by the interferometer-detectors, and a communication channel between the receiver and the transmitter.

* * * * *